(12) United States Patent
Long

(10) Patent No.: US 12,075,496 B2
(45) Date of Patent: Aug. 27, 2024

(54) METHOD AND APPARATUS FOR NETWORK FUNCTION MANAGING NIDD SESSION

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 395 days.

(21) Appl. No.: 17/604,879

(22) PCT Filed: Jun. 28, 2019

(86) PCT No.: PCT/CN2019/093805
§ 371 (c)(1),
(2) Date: Oct. 19, 2021

(87) PCT Pub. No.: WO2020/215486
PCT Pub. Date: Oct. 29, 2020

(65) Prior Publication Data
US 2022/0225444 A1 Jul. 14, 2022

(30) Foreign Application Priority Data

Apr. 26, 2019 (WO) ................ PCT/CN2019/084503

(51) Int. Cl.
*H04W 4/00* (2018.01)
*H04W 48/16* (2009.01)
(Continued)

(52) U.S. Cl.
CPC ........... *H04W 76/12* (2018.02); *H04W 48/16* (2013.01); *H04W 48/18* (2013.01); *H04W 88/18* (2013.01)

(58) Field of Classification Search
USPC ........................................................ 370/329
See application file for complete search history.

(56) References Cited

U.S. PATENT DOCUMENTS 9,692,567 B1    6/2017   Vaidya et al.
11,425,762 B2*  8/2022   Li ......................... H04W 76/10
(Continued)

FOREIGN PATENT DOCUMENTS

CN    109104394 A    12/2018
CN    109120528 A    1/2019
(Continued)

OTHER PUBLICATIONS

"3GPP TS 23.501 V16.0.2", 3rd Generation Partnership Project; Technical Specification Group Services and System Aspects; System Architecture for the 5G System; Stage 2 (Release 16), Apr. 2019, pp. 1-317.
(Continued)

*Primary Examiner* — Chuong T Ho
(74) *Attorney, Agent, or Firm* — Murphy, Bilak & Homiller, PLLC

(57) ABSTRACT

Embodiments of the present disclosure relates to a method and an apparatus for a network function managing NIDD session. The method comprises: receiving (S101) a request for establishing a NIDD session, wherein NIDD refers to non-internet protocol data delivery; and selecting (S102) a user plane function, UPF, or a network exposure function, NEF, for establishing the NIDD session. According to embodiments of the present disclosure, the selection between the different mechanisms for NIDD session may be configured explicitly. Thus, the efficiency of managing NIDD session is improved.

17 Claims, 6 Drawing Sheets

---

S 101
Receive a request for establishing a NIDD session

S 102
Select a user plane function, UPF, or a network exposure function, NEF, for establishing the NIDD session

(51) Int. Cl.
*H04W 48/18* (2009.01)
*H04W 76/12* (2018.01)
*H04W 88/18* (2009.01)

(56) References Cited

U.S. PATENT DOCUMENTS

| | | | | |
|---|---|---|---|---|
| 2018/0199398 A1* | 7/2018 | Dao | | H04W 76/34 |
| 2018/0343601 A1 | 11/2018 | Livanos | | |
| 2019/0059067 A1 | 2/2019 | Lee et al. | | |
| 2019/0261453 A1* | 8/2019 | Jain | | H04W 8/183 |
| 2020/0100319 A1* | 3/2020 | Talebi Fard | | H04W 4/90 |
| 2020/0128614 A1 | 4/2020 | Ying et al. | | |
| 2020/0146077 A1* | 5/2020 | Li | | H04W 76/10 |
| 2021/0274575 A1* | 9/2021 | Talebi Fard | | H04W 76/12 |

FOREIGN PATENT DOCUMENTS

| | | |
|---|---|---|
| CN | 113728721 B | 12/2022 |
| RU | 2614537 C2 | 3/2017 |
| WO | 2018232241 A1 | 12/2018 |

OTHER PUBLICATIONS

"3GPP TS 29.503 V15.3.0", 3rd Generation Partnership Project; Technical Specification Group Core Network and Terminals; 5G System; Unified Data Management Services; Stage 3 (Release 15), Mar. 2019, pp. 1-187.

"3GPP TS 23.502 V16.0.2", 3rd Generation Partnership Project; Technical Specification Group Services and System Aspects; Procedures for the 5G System; Stage 2 (Release 16), Apr. 2019, pp. 1-290.

"3GPP TR 23.724 V16.0.0", 3rd Generation Partnership Project; Technical Specification Group Services and System Aspects; Study on Cellular Internet of Things (IoT) support and evolution for the 5G System (Release 16), Dec. 2018, pp. 1-276.

"5G CIoT NIDO over User Plane", 3GPP TSG-SA WG2 Meeting #132, S2-1903763 (revision of S2-19xxxxx), Xian, P.R. China, Feb. 8-12, 2019, pp. 1-17.

"Correcting AMF behaviour for Service Request that is not integrity protected", SA WG2 Meeting #132, S2-1903668, Xi'an, PRC, Apr. 8-12, 2019, pp. 1-376.

* cited by examiner

US 12,075,496 B2

METHOD AND APPARATUS FOR NETWORK FUNCTION MANAGING NIDD SESSION

TECHNICAL FIELD

The present disclosure relates generally to the technology of communication system, and in particular, to a method and an apparatus for a network function managing NIDD session.

BACKGROUND

This section introduces aspects that may facilitate better understanding of the present disclosure. Accordingly, the statements of this section are to be read in this light and are not to be understood as admissions about what is in the prior art or what is not in the prior art.

In communication systems, (such as 5th generation, 5G, communication system), a protocol data unit (PDU) Connectivity Service provides exchange of PDUs between a terminal device (such as a user equipment, UE), and a data network identified by a data network name (DNN). The PDU Connectivity Service is supported via PDU Sessions that may be established upon request from the UE.

Each PDU Session supports a single PDU Session type, i.e. supports the exchange of a single type of PDU requested by the UE at the establishment of the PDU Session. The following PDU Session types are defined: internet protocol version 4 (IPv4), IPv6, IPv4v6, Ethernet, and Unstructured. The data delivery via an unstructured PUD session may also be named as non-ID data delivery, NIDD.

Functions for NIDD may be used to handle Mobile Originated (MO) and Mobile Terminated (MT) communication with terminal devices, where the data used for the communication is considered unstructured (which we refer to also as Non-IP). Such delivery may be accomplished by different mechanisms.

However, a network function managing such NIDD session does not know how to select the specific one of the different mechanisms. The efficiency of managing NIDD session is affected, or the establishment of the NIDD session might fail sometimes due to an improper selection of the mechanism.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, the selection between the different mechanisms for NIDD session may be configured explicitly. Thus, the efficiency of managing NIDD session is improved.

A first aspect of the present disclosure provides a method performed at a network function, comprising: receiving a request for establishing a NIDD session, wherein NIDD refers to non-internet protocol data delivery; and selecting a user plane function, UPF, or a network exposure function, NEF, for establishing the NIDD session.

In embodiments of the present disclosure, the network function selects the UPF, or the NEF, based on a session management data.

In embodiments of the present disclosure, the session management data comprises: an indication of the UPF, or the NEF.

In embodiments of the present disclosure, the indication has a boolean value; and a true value of the boolean value indicates to select the NEF, and a false value or an absence of the boolean value indicates to select the UPF.

In embodiments of the present disclosure, the session management data further comprises: an identity of the NEF.

In embodiments of the present disclosure, the session management data further comprises: information for a connection from the network function to the NEF; and the information for the connection from the network function to the NEF includes at least one of: an external group identifier, an external identifier, a mobile station international subscriber directory number, MSISDN, or an application function identifier.

In embodiments of the present disclosure, the method further comprises: obtaining the session management data from a unified data management, UDM.

In embodiments of the present disclosure, the UDM obtains the session management data from a unified data repository, UDR.

In embodiments of the present disclosure, the session management data is provisioned by an operator.

In embodiments of the present disclosure, the method further comprises: obtaining, from a network repository function, NRF, service information about the NEF, when the NEF is selected.

In embodiments of the present disclosure, the method further comprises: transmitting, to the NEF, a create request for the NIDD session; and receiving, from the NEF, a response for the create request for the NIDD session.

In embodiments of the present disclosure, the network function comprises: a session management function, SMF.

In embodiments of the present disclosure, the network function receives the request for establishing the NIDD session from an access and mobility management function, AMF.

A second aspect of the present disclosure provides an apparatus for a network function, comprising: a processor; and a memory, containing instructions executable by the processor. The apparatus is operative to: receive a request for establishing a NIDD session, wherein NIDD refers to non-internet protocol data delivery; and select a user plane function, UPF, or a network exposure function, NEF, for establishing the NIDD session.

In embodiments of the present disclosure, the apparatus is further operative to implement the method according to any of the above embodiments.

A third aspect of the present disclosure provides an apparatus for a network function, comprising: a reception unit, configured to receive a request for establishing a NIDD session, wherein NIDD refers to non-internet protocol data delivery; and a selection unit, configured to select a user plane function, UPF, or a network exposure function, NEF, for establishing the NIDD session.

A fourth aspect of the present disclosure provides a computer readable storage medium having a computer program stored thereon, the computer program executable by a device to cause the device to carry out the method according to any of the above embodiments.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
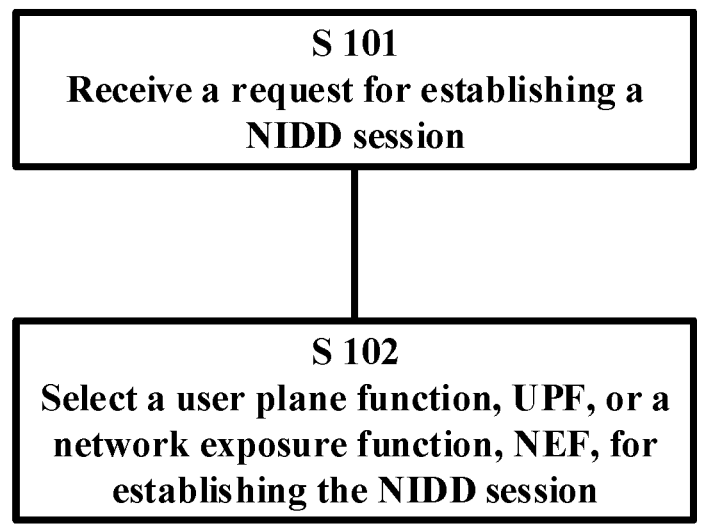
FIG. 1 is an exemplary flow chart showing a method performed at a network function, according to embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network function" or "network node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCEF, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network function/node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term terminal device encompasses a device which is able to communicate with a network function/node such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a user equipment, UE, implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is an exemplary flow chart showing a method performed at a network function, according to embodiments of the present disclosure.

As shown in FIG. 1, the method performed at a network function comprises: S101, receiving a request for establishing a NIDD session, wherein NIDD refers to non-internet protocol data delivery; and S102, selecting a user plane function, UPF, or a network exposure function, NEF, for establishing the NIDD session.

The NIDD from the UE to the application function, AF, may be accomplished by one of the following two mechanisms:

Delivery using NEF via NIDD channel;
Delivery using UPF via a Point-to-Point (PtP) N6 tunnel.

According to embodiments of the present disclosure, the selection between the different mechanisms for NIDD session (such as via UPF or via NEF) may be configured explicitly. Thus, the efficiency of managing NIDD session is improved.

Figure 2:
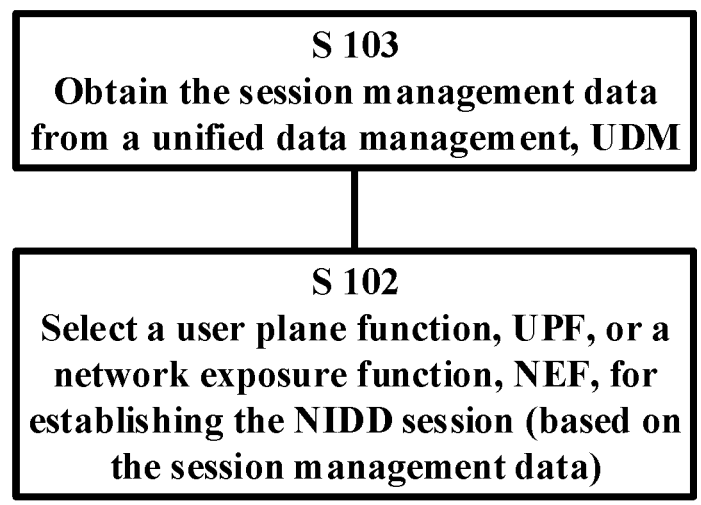
FIG. 2 is another exemplary flow chart showing a method performed at a network function, according to embodiments of the present disclosure.

FIG. 2 is another exemplary flow chart showing a method performed at a network function, according to embodiments of the present disclosure.

As shown in FIG. 2, the method may further comprise: S103, obtaining the session management data from a unified data management, UDM. Then, in the step S102, the network function may select the UPF, or the NEF, based on a session management data.

According to embodiments of the present disclosure, the session management data, or named as the session management subscription data, in UDM may contain specific information for NIDD session management.

In embodiments of the present disclosure, the network function comprises: a session management function, SMF.

The SW' may determine which one of the above two mechanisms should be used for Unstructured PDU session establishment: delivery using NEF via NIDD channel or using UPF via N6 channel.

Figure 3:
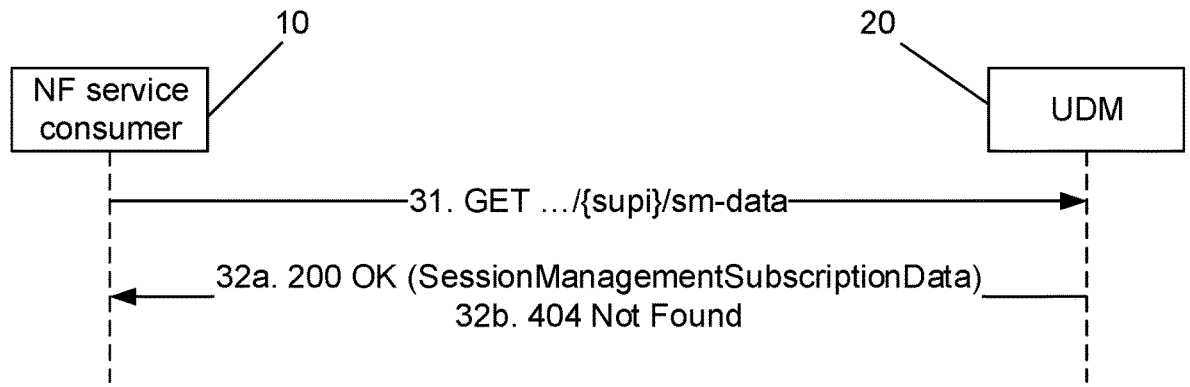
FIG. 3 is an exemplary diagram showing a procedure for obtaining the session management data from UDM.

FIG. 3 is an exemplary diagram showing a procedure for obtaining the session management data from UDM.

As shown in FIG. 3, a NF service consumer (e.g. SMF) 10 sends a request to the UDM 20 to receive the UE's session management subscription data (see also 3rd generation partnership project technical specification, 3GPP TS, 29.503 V15.3.0). The request contains the UE's identity (/{supi}), the type of the requested information (/sm-data), and query parameters (single-nssai, dnn, supported-features, plmn-id). The term "supi" refers to Subscription Permanent Identifier. The term "sm-data" refers to session management-data. The term "single-nssai" refers to Single Network Slice Selection Assistance Information. The term "dnn" refers to data network name. The term "plmn-id" refers to Public Land Mobile Network Identifier.

Specifically, in step 31, the NF service consumer (e.g. SMF) 10 sends a GET request to the resource representing the UE's session management subscription data, with query parameters indicating the selected network slice and/or the DNN and/or supported-features and/or plmn-id.

In step 32a, on success, the UDM responds with "200 OK", the message body containing the UE's session management subscription data as relevant for the requesting NF service consumer.

The exemplary data structure about session management subscription data may be listed as follows.

Type: SessionManagementSubscriptionData (from 3GPP TS 29.503 V15.3.0, Clause 6.1.6.2.8)

TABLE 1

SessionManagementSubscriptionData

| Attribute name | Data type | P | Cardinality | Description |
| --- | --- | --- | --- | --- |
| singleNssai | Snssai | M | 1 | A single Network Slice Selection Assistance Information |
| dnnConfigurations | map(DnnConfiguration) | O | 0 . . . N | Additional DNN configurations for the network slice; A map (list of key-value pairs where dnn serves as key; see subclause 6.1.6.1) of DnnConfigurations. |
| internalGroupIds | array(GroupId) | O | 1 . . . N | List of internal group identifier; see 3GPP TS 23.501 [2] subclause 5.9.7 |
| sharedDnnConfigurationsId | SharedDataId | O | 1 . . . 0 | Identifier of shared data. |

NOTE:
A single UE-individual dnnConfiguration (within dnnConfigurations) may clash with a shared dnnConfiguration (i.e. both have the same dnn value as key). In this case the UE-individual dnnConfiguration takes precedence.

Type: DnnConfiguration (from 3GPP TS 29.503 V15.3.0, Clause 6.1.6.2.9)

TABLE 2

DnnConfiguration

| Attribute name | Data type | P | Cardinality | Description |
| --- | --- | --- | --- | --- |
| pduSessionTypes | PduSessionTypes | M | 1 | Default/Allowed session types |
| sscModes | SscModes | M | 1 | Default/Allowed SSC modes |
| iwkEpsInd | IwkEpsInd | O | 0 . . . 1 | Indicates whether interworking with EPS is subscribed: true: Subscribed; false: Not subscribed; If this attribute is absent it means not subscribed. |
| 5gQosProfile | SubscribedDefaultQos | O | 0 . . . 1 | 5G QoS parameters associated to the session for a data network |
| sessionAmbr | Ambr | O | 0 . . . 1 | The maximum aggregated uplink and downlink bit rates to be shared across all Non-GBR QoS Flows in each PDU Session |
| 3gppChargingCharacteristics | 3GppChargingCharacteristics | O | 0 . . . 1 | Subscribed charging characteristics data associated to the session for a data network |
| staticIpAddress | array(IpAddress) | O | 1 . . . 2 | Subscribed static IP address(es) of the IPv4 and/or IPv6 type |
| upSecurity | UpSecurity | O | 0 . . . 1 | When present, this IE shall indicate the security policy for integrity protection and encryption for the user plane. |

In step 32b, if there is no valid subscription data for the UE, or if the UE subscription data exists, but the requested session management subscription is not available (e.g. query parameter contains network slice and/or DNN that does not belong to the UE subscription), HTTP status code "404 Not Found" shall be returned including additional error information in the response body (in the "ProblemDetails" element).

On failure, the appropriate HTTP status code indicating the error shall be returned and appropriate additional error information should be returned in the GET response body.

According to embodiments of the present disclosure, the SMF obtains the session management data from the UDM, utilizing currently existing procedures. Therefore, no extra procedure is needed during NIDD. The efficiency for establishing the NIDD session is improved.

In embodiments of the present disclosure, the session management data comprises: an indication of the UPF, or the NEF.

In embodiments of the present disclosure, the indication has a boolean value; and a true value of the boolean value indicates to select the NEF, and a false value or an absence of the boolean value indicates to select the UPF.

In embodiments of the present disclosure, the session management data further comprises: an identity of the NEF.

In embodiments of the present disclosure, the session management data further comprises: information for a connection from the network function to the NEF; and the information for the connection from the network function to the NEF includes at least one of: an external group identifier, an external identifier, a mobile station international subscriber directory number, MSISDN, or an application function identifier. The external group identifier, the external identifier, MSISDN are about the UE, and the application function identifier is about the application function, AF.

According to embodiments of the present disclosure, the specific session management data for NIDD may be constructed based on the data structure shown in table 1, and/or table 2. For example, the specific session management data in embodiments of the present disclosure comprises: an updated NIDD configuration as follows.

Type: NiddDnnConfiguration (updated based on table 2)

TABLE 3

NiddDnnConfiguration (different parts to table 2 are underlined and in bold)

| Attribute name | Data type | P | Cardinality | Description |
| --- | --- | --- | --- | --- |
| pduSessionTypes | PduSessionTypes | M | 1 | Default/Allowed session types Unstructured supported |
| sscModes | SscModes | M | 1 | Default/Allowed SSC modes |
| iwkEpsInd | IwkEpsInd | O | 0 . . . 1 | Indicates whether interworking with EPS is subscribed: true: Subscribed; false: Not subscribed; If this attribute is absent it means not subscribed. |
| 5gQosProfile | SubscribedDefaultQos | O | 0 . . . 1 | 5G QoS parameters associated to the session for a data network |
| sessionAmbr | Ambr | O | 0 . . . 1 | The maximum aggregated uplink and downlink bit rates to be shared across all |

TABLE 3-continued

NiddDnnConfiguration (different parts to table 2 are underlined and in bold)

| Attribute name | Data type | P | Cardinality | Description |
|---|---|---|---|---|
| | | | | Non-GBR QoS Flows in each PDU Session |
| 3gppChargingCharacteristics | 3GppChargingCharacteristics | O | 0 . . . 1 | Subscribed charging characteristics data associated to the session for a data network |
| staticIpAddress | array(IpAddress) | O | 1 . . . 2 | Subscribed static IP address(es) of the IPv4 and/or IPv6 type |
| upSecurity | UpSecurity | O | 0 . . . 1 | When present, this IE shall indicate the security policy for integrity protection and encryption for the user plane. |
| invokeNefSelection | boolean | O | 0 . . . 1 | When present, this IE shall indicate whether to invoke NEF selection: true: to invoke the NEF selection false or absent: not to invoke the NEF selection |
| nefId | NfInstanceId | C | 0 . . . 1 | Indicates the NEF identity which is to be selected for this DNN. It is required if "Invoke NEF Selection" indicator is set. |
| niddInformation | NiddInformation | C | 0 . . . 1 | Information such as External Group Identifier, External Identifier, MSISDN, or AF ID used for SMF-NEF Connection. |

According to embodiments of the present disclosure, the specific session management data for NIDD may be constructed based on the data structure currently existing, by adding an explicit indicator and/or other information. The selection by the SMF will be processed explicitly, with an update to the current processing algorithm. The update cost to current network functions, in software or hardware, may be reduced.

It should be understood the specific data type, and/or the name of the added parameter may not be limited. For example, a numeric rather than a boolean value may be alternatively utilized for the indicator. A numeric "1" may replace the true value, and a numeric "0" may replace the false value.

Figure 4:
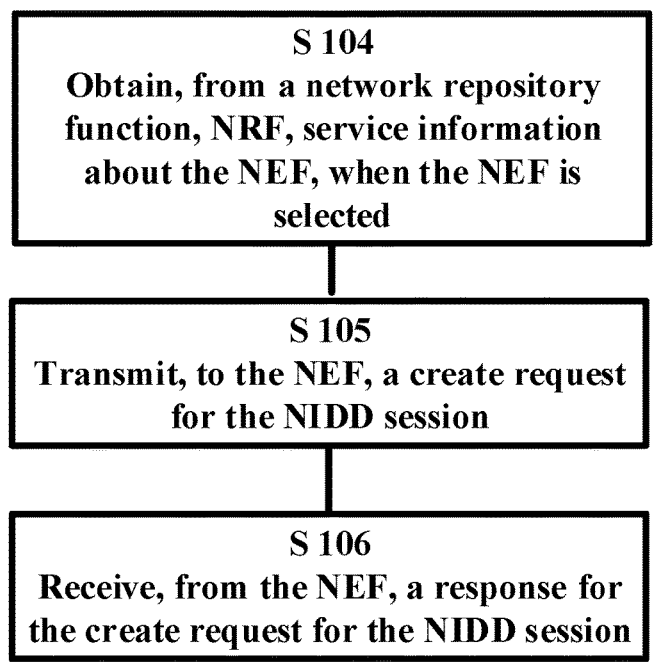
FIG. 4 is an exemplary flow chart showing other steps in the method, according to embodiments of the present disclosure.

FIG. 4 is an exemplary flow chart showing other steps in the method, according to embodiments of the present disclosure.

As shown in FIG. 4, the method may further comprise: S104, obtaining, from a network repository function, NRF, service information about the NEF, when the NEF is selected.

In embodiments of the present disclosure, the method may further comprise: S105, transmitting, to the NEF, a create request for the NIDD session; and S106, receiving, from the NEF, a response for the create request for the NIDD session.

Figure 5:
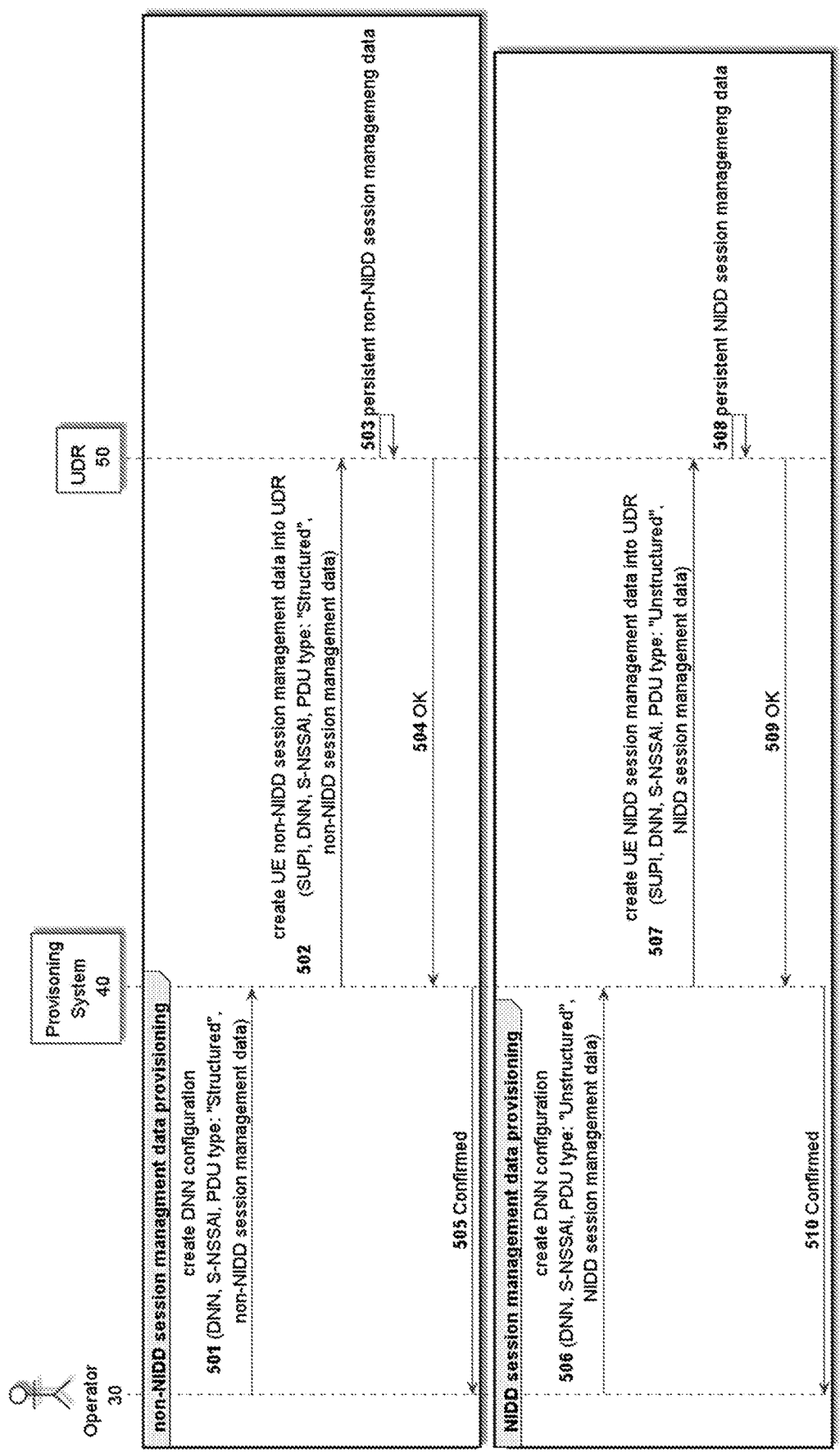
FIG. 5 is an exemplary diagram showing a procedure of provisioning NIDD and non-NIDD session management data.

FIG. 5 is an exemplary diagram showing a procedure of provisioning NIDD and non-NIDD session management data.

In embodiments of the present disclosure, the session management data is provisioned by an operator.

FIG. 5 shows following steps of provisioning NIDD configuration:

Step 501: operator 30 creates the DNN configuration with PDU type as "Structured", together with other information such as DNN name, S-NSSAI etc. (table 2) through the provisioning system 40; non-NIDD session management data may refers to session management data rather than NIDD type, such as IPv4, IPv6, IPv4v6, Ethernet, etc.

Step 502: the provisioning system 40 creates the non-NIDD session management data for the applied UE into UDR 50;

Step 503: UDR 50 persistent the non-NIDD session management data for the UE;

Step 504: UDR 50 respond to the Provisioning System 40 for the success of the persistence of non-NIDD session management data;

Step 505: The Provisioning system 40 confirmed operator 30's provisioning operation;

Step 506: operator 30 creates the DNN configuration with PDU type as "Unstructured", together with other information such as DNN name, S-NSSAI etc. (table 3) through the provisioning system 40;

Step 507: the provisioning system 40 creates the NIDD session management data for the applied UE into UDR 50;

Step 508: UDR 50 persistent the NIDD session management data for the UE;

Step 509: UDR 50 responds to the Provisioning System 40 for the success of the persistence of NIDD session management data;

Step 510: The Provisioning system 40 confirmed operator 30's provisioning operation.

Figure 6:
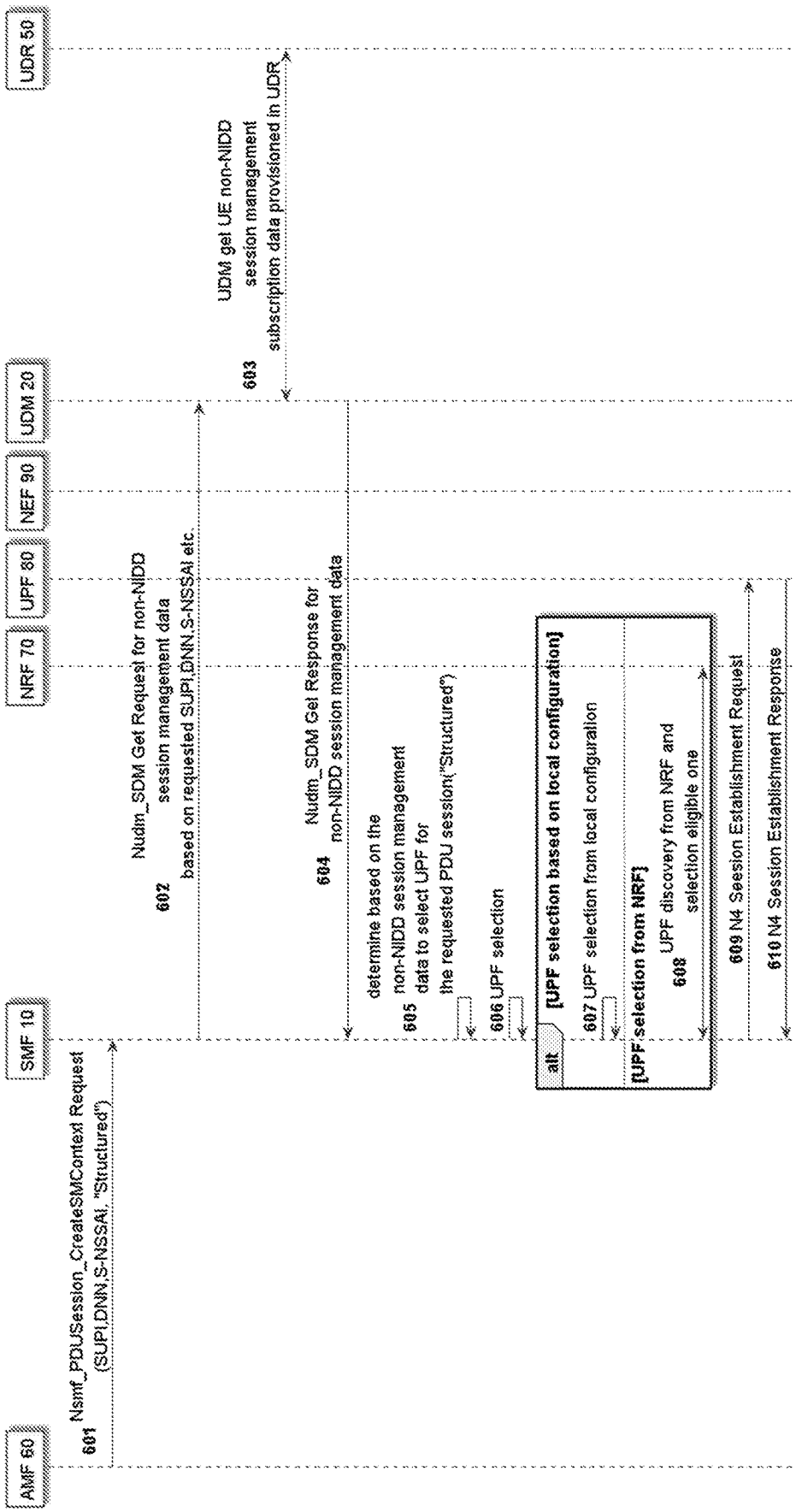
FIG. 6 is an exemplary diagram showing a procedure of controlling session establishment, based on non-NIDD session management data.

FIG. 6 is an exemplary diagram showing a procedure of controlling session establishment, based on non-NIDD session management data.

FIG. 6 shows following steps of controlling session establishment, based on non-NIDD session management data:

Step 601: SMF 10 received the PDU session establishment request from AMF with requested PDU session type as "Structured" (represent for PDU session type of IPv4, IPv6, IPv4v6 etc.);

Step 602: SMF 10 could decide to get the non-NIDD session management data from UDM based on the requested PDU session type as Structured, the input data include SUPI, DNN, S-NSSAI etc;

Step 603: UDM 20 retrieve the non-NIDD session management data from UDR if provisioned in UDR;

Step 604: UDM 20 respond SMF with non-NIDD session management data;

Step 605: SMF 10 determine on the non-NIDD session management data to select UPF for the requested PDU session ("Structured");

Step 606: SMF 10 start UPF selection;

Step 607: SMF 10 could select UPF 80 form local configuration if has;

Step 608: SMF 10 try to discover UPF 80 from NRF 70 and select eligible one to serve the PDU session establishment; step 608 is alternative for step 607;

Step 609: SMF 10 send N4 session establish request to the selected UPF 80;

Step 610: UPF 80 process the request and respond to the SMF 10 for the session info of the created non-NIDD session.

Figure 7:
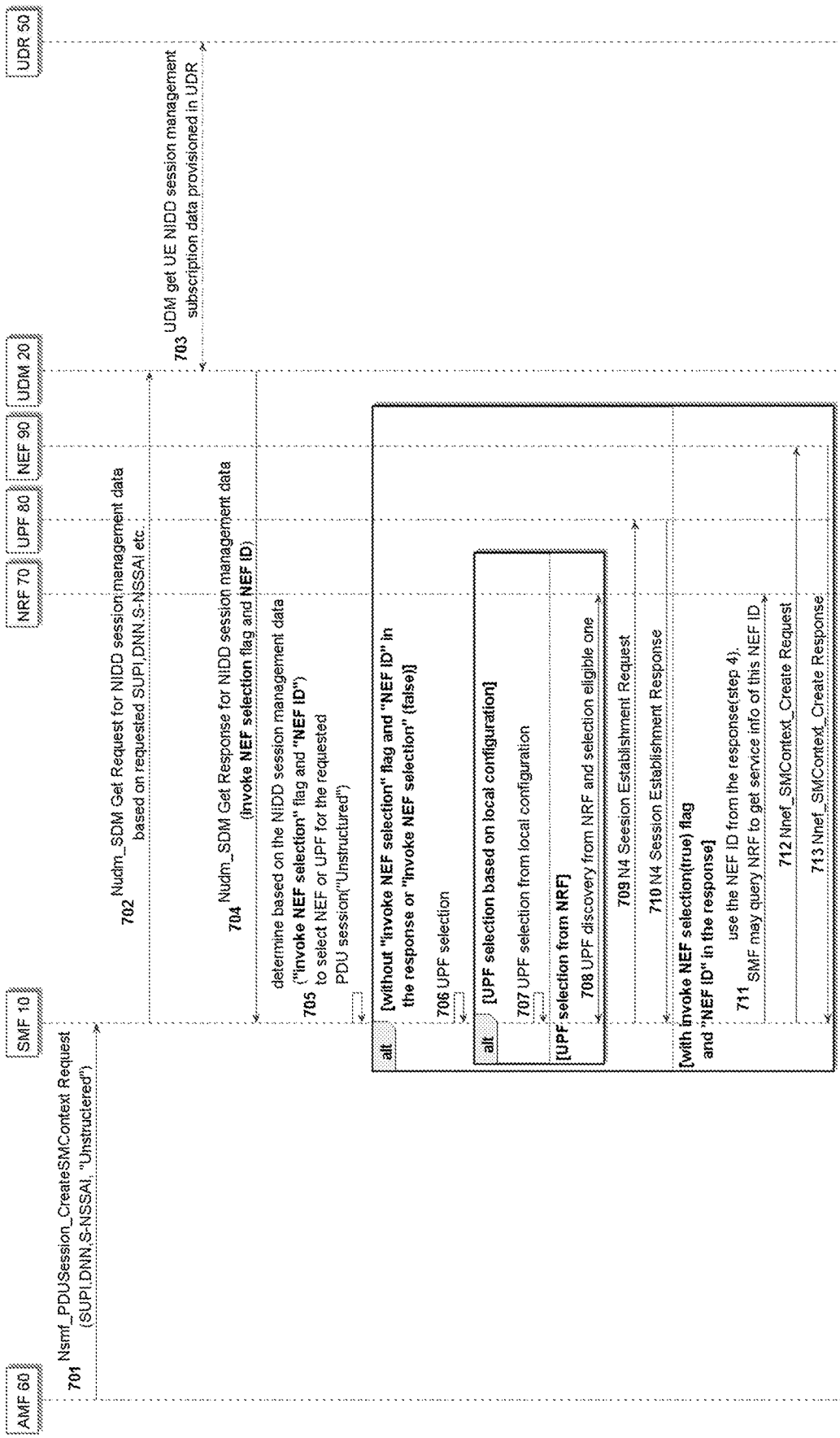
FIG. 7 is an exemplary diagram showing a procedure of controlling session establishment, based on NIDD session management data.

FIG. 7 is an exemplary diagram showing a procedure of controlling session establishment, based on NIDD session management data.

In embodiments of the present disclosure, the UDM obtains the session management data from a unified data repository, UDR.

In embodiments of the present disclosure, the network function receives the request for establishing the NIDD session from an access and mobility management function, AMF.

FIG. 7 depicts the sequence flow for the PDU session establishment for NIDD session ("Unstructured"). According to embodiments of the present disclosure, SMF 10 gets the NIDD session management data from UDM 20 and based on that info to decide how to establish the UE requested PDU session, either towards UPF or towards NEF 90. SMF 10 determines to execute the UPF selection or use NEF ID, then continue the PDU session establishment procedures.

Specifically, FIG. 7 shows following steps of controlling session establishment, based on NIDD session management data:

Step 701: UE send request to AMF 60 through the radio access network (RAN) to establish a PDU session ("Unstructured"). The AMF 60 determines that the message corresponds to a request for a new PDU Session based on that Request Type indicates "initial request" and that the PDU Session ID is not used for any existing PDU Session(s) of the UE. AMF 60 selects a SMF 10 and send Nsmf_PDUsession_CreateSMContext request to SMF 10 with requested PDU session type as "Unstructured";

Step 702: SMF 10, based on the requested PDU session type ("Unstructure"), sends a Nudm_SDM GET request to the resource representing the UE's NIDD session management subscription data, with query parameters indicating the selected network slice and/or the DNN and/or supported-features and/or plmn-id;

Step 703: UDM 20, if stateless, gets the UE NIDD session management subscription data from UDR 50; with the embodiment as table 3, for UE NIDD session management data, both the flag "invoke NEF selection" and NEF ID provisioned before shall be returned to UDM 20;

Step 704: On success, the UDM 20 responds with "200 OK", the message body containing the UE's NIDD session management subscription data;

UDM 20 will send, in the response to the SMF 20, the NIDD session management data with "invoke NEF selection" set to true and the NEF ID which shall be used for the NIDD session and other NIDD information such as External Group Identifier, External Identifier, MSISDN or AF ID used for the SMF-NEF connection, the protocol data shall be updated as embodiment in table 3;

Step 705: SMF 10, when received the NIDD session management data, determines, based on whether the "invoke NEF selection" flag is set, to execute UPF selection or use the NEF ID;

Step 706: SMF 10 decides (base on the NIDD session management data) to execute UPF selection if there is no "invoke NEF selection" flag in the response or the flag is set to false;

Step 707: SMF 10 select UPF 80 from local configuration if has;

Step 708: SMF 10 discover UPF 80 from NRF 70 and select one eligible UPF for the UE requested PDU session; step 708 is alternative for step 707;

Step 709: If Request Type indicates "initial request", the SMF initiates an N4 Session Establishment procedure with the selected UPF;

Step 710: UPF 80 processes the request and respond to the SMF 10 for the session info of the created NIDD session;

Step 711: SMF 10 use the NEF ID if there is "invoke NEF selection" flag in the NIDD session management data set to true and NEF ID present (Step 5), SMF 10 may query NRF 70 to get service info of this NEF ID;

Step 712: SMF 10 shall create a PDU session towards the NEF 90, the SMF invokes Nnef_SMContext_Create Request; the parameters in the Nnef_SMContext_Create Request may contain: User identity, PDU session ID, NEF ID, NIDD information, S-NSSAI, DNN etc; if no AF has previously performed the NIDD Configuration procedure with the NEF 90 for the user identity received, then the NEF 90 initiates the NIDD configuration procedure (for configuring necessary information for data delivery via the NIDD) before step 713;

Step 713: The NEF 90 creates a NEF PDU session Context, the NEF 90 invokes Nnef_SMContext_Create Request Response;

The NEF 90 creates a NEF PDU session Context and associates it with the User Identity and PDU session ID, the Nef_SMContext_Create Request Response message may contain: User Identity, PDU session ID, NEF ID, S-NSSAI, DNN etc. NEF 90 confirms towards the SMF the establishment of the PDU session in NEF for the UE.

Steps 711-713 are alternative for steps 706-710.

According to embodiments of the present disclosure, the selection between the different mechanisms for NIDD session may be configured explicitly. Thus, the efficiency of managing NIDD session is improved.

Further, the session management data, or named as the session management subscription data, in UDM may contain specific information for NIDD session management.

According to embodiments of the present disclosure, the SMF obtains the session management data from the UDM, utilizing currently existing procedures. Therefore, no extra procedure is needed during NIDD session establishment. The efficiency for establishing the NIDD session is improved.

Further, the specific session management data for NIDD may be constructed based on the data structure shown in table 1, and/or table 2. According to embodiments of the present disclosure, the specific session management data for NIDD may be constructed based on the data structure currently existing, by adding an explicit indicator and/or other information. The selection by the SMF will be processed explicitly, with an update to the current processing algorithm. The update cost to current network functions, in software or hardware, may be reduced.

Figure 8:
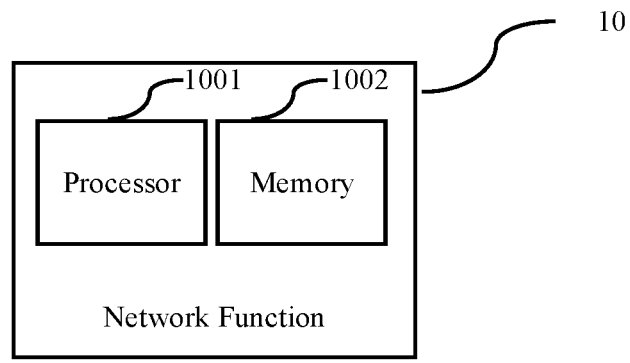
FIG. 8 is a block diagram showing the network node, according to embodiments of the present disclosure.

FIG. 8 is a block diagram showing the network node, according to embodiments of the present disclosure.

A second aspect of the present disclosure provides an apparatus for a network function 10, such as the SMF 10, comprising: a processor 1001; and a memory 1002, containing instructions executable by the processor 1001. The apparatus is operative to: receive (S101) a request for establishing a NIDD session, wherein NIDD refers to non-internet protocol data delivery; and select (S102) a user plane function, UPF, or a network exposure function, NEF, for establishing the NIDD session.

In embodiments of the present disclosure, the apparatus is further operative to implement the method according to any of the above embodiments, such as the methods in FIGS. 1, 2, 4.

The processor 1001 may be any kind of processing component, such as one or more microprocessor or microcontrollers, as well as other digital hardware, which may include digital signal processors (DSPs), special-purpose digital logic, and the like. The memory 1002 may be any kind of storage component, such as read-only memory (ROM), random-access memory, cache memory, flash memory devices, optical storage devices, etc.

Figure 9:
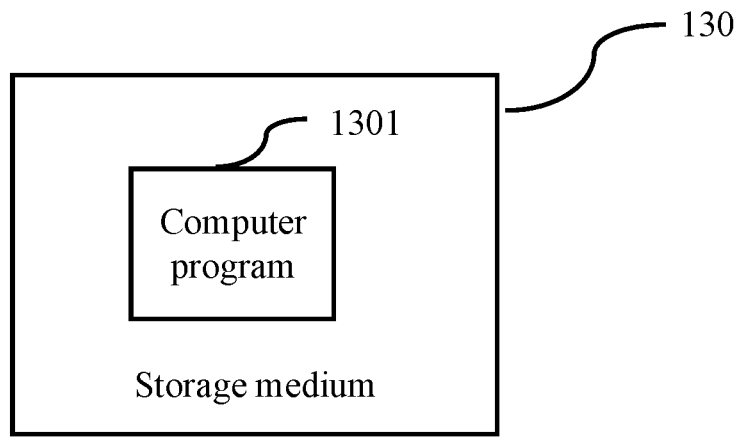
FIG. 9 is a block diagram showing a computer readable storage medium, according to embodiments of the present disclosure.

FIG. 9 is a block diagram showing a computer readable storage medium, according to embodiments of the present disclosure.

The computer readable storage medium 130 having a computer program 1301 stored thereon, the computer program 1301 is executable by a device to cause the device to carry out the method according to any of the above embodiments, such as the methods in FIGS. 1, 2, 4.

The computer readable storage medium 130 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 10:
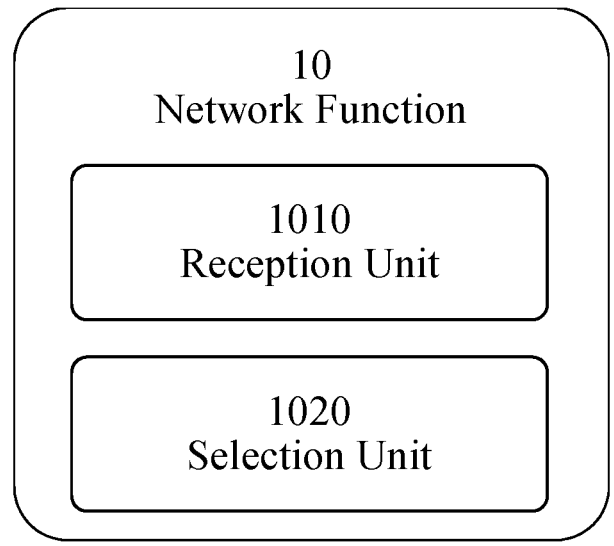
FIG. 10 is a block diagram showing function units of the network node, according to embodiments of the present disclosure.

FIG. 10 is a block diagram showing function units of the network node, according to embodiments of the present disclosure.

The apparatus for a network function 10, comprises: a reception unit 1010, configured to receive a request for establishing a NIDD session, wherein NIDD refers to non-internet protocol data delivery; and a selection unit 1020, configured to select a user plane function, UPF, or a network exposure function, NEF, for establishing the NIDD session.

The term unit/function unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 10 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed by a network function in a communication network, comprising:
    receiving a request for establishing a non-internet protocol data delivery (NIDD) session; and selecting a user plane function (UPF) or a network exposure function (NEF), associated with the communication network, for establishing the NIDD session, wherein:
  the selecting is based on a boolean-valued indication in session management data;
  the NEF is selected when the indication has a true value; and
  the UPF is selected when the indication has a false value or is absent from the session management data.

2. The method of claim 1, wherein the session management data also includes an identity of the NEF.

3. The method of claim 1, wherein:
  the session management data also includes information for a connection from the network function to the NEF; and
  the information for the connection from the network function to the NEF includes at least one of the following: an external group identifier, an external identifier, a mobile station international subscriber directory number (MSISDN), or an application function (AF) identifier.

4. The method of claim 1, further comprising obtaining the session management data from a unified data repository (UDR) associated with the communication network.

5. The method of claim 4, wherein the session management data is obtained from the UDR via a unified data management (UDM) function associated with the communication network.

6. The method of claim 1, wherein the session management data is provisioned by an operator.

7. The method of claim 1, further comprising, based on selecting the NEF, obtaining service information about the NEF from a network repository function (NRF) associated with the communication network.

8. The method of claim 7, further comprising:
  based on the obtained service information, transmitting to the NEF a create request for the NIDD session; and
  receiving from the NEF a response to the create request for the NIDD session.

9. The method of claim 1, wherein the network function is a session management function (SMF).

10. The method of claim 1, wherein the request for establishing the NIDD session is received from an access and mobility management function (AMF) associated with the communication network.

11. An apparatus configured to provide a network function in a communication network, comprising:
  a processor; and
  a computer-readable storage medium containing instructions executable by the processor, whereby the apparatus is configured to:
    receive a request for establishing a non-internet protocol data delivery (NIDD) session; and
    select a user plane function (UPF) or a network exposure function (NEF), associated with the communication network, for establishing the NIDD session, wherein:
      the selection is based on a boolean-valued indication in session management data;
      the NEF is selected when the indication has a true value; and
      the UPF is selected when the indication has a false value or is absent from the session management data.

12. The apparatus of claim 11, wherein the session management data also includes one or more of the following:
  an identity of the NEF; and
  information for a connection from the network function to the NEF, which includes one or more of the following: an external group identifier, an external identifier, a mobile station international subscriber directory number (MSISDN), or an application function (AF) identifier.

13. The apparatus of claim 11, wherein execution of the instructions further configures the apparatus to, based on selecting the NEF, obtain service information about the NEF from a network repository function (NRF) associated with the communication network.

14. The apparatus of claim 11, wherein:
  the network function is a session management function (SMF); and
  the request for establishing the NIDD session is received from an access and mobility management function (AMF) associated with the communication network.

15. The apparatus of claim 11, wherein execution of the instructions further configures the apparatus to obtain the session management data from a unified data repository (UDR) associated with the communication network.

16. The apparatus of claim 15, wherein the session management data is obtained from the UDR via a unified data management (UDM) function associated with the communication network.

17. The apparatus of claim 11, wherein execution of the instructions further configures the apparatus to:
  based on the obtained service information, transmit to the NEF a create request for the NIDD session; and
  receive from the NEF a response to the create request for the NIDD session.

* * * * *

UNITED STATES PATENT AND TRADEMARK OFFICE
CERTIFICATE OF CORRECTION

PATENT NO. : 12,075,496 B2  
APPLICATION NO. : 17/604879  
DATED : August 27, 2024  
INVENTOR(S) : Hongxia Long It is certified that error appears in the above-identified patent and that said Letters Patent is hereby corrected as shown below:

On the Title Page

On Page 2, item (56), under "OTHER PUBLICATIONS", in Column 2, Line 13, delete "CloT" and insert -- CIoT --, therefor.

In the Drawings

In Fig. 5, Sheet 3 of 6, for Tag "503", in Line 1, delete "managemeng" and insert -- management --, therefor.

In Fig. 5, Sheet 3 of 6, for Tag "508", in Line 1, delete "managemeng" and insert -- management --, therefor.

In Fig. 5, Sheet 3 of 6, for Tag "40", in Line 1, delete "Provisoning" and insert -- Provisioning --, therefor.

In Fig. 5, Sheet 3 of 6, delete "managment" and insert -- management --, therefor.

In Fig. 6, Sheet 4 of 6, for Tag "609", in Line 1, delete "Seesion" and insert -- Session --, therefor.

In Fig. 7, Sheet 5 of 6, for Tag "709", in Line 1, delete "Seesion" and insert -- Session --, therefor.

In Fig. 7, Sheet 5 of 6, for Tag "701", in Line 2, delete ""Unstructered")" and insert -- "Unstructured") --, therefor.

In the Specification

In Column 6, Line 17, delete "SW'" and insert -- SMF --, therefor.

Signed and Sealed this  
Eighteenth Day of February, 2025

Coke Morgan Stewart  
*Acting Director of the United States Patent and Trademark Office*

CERTIFICATE OF CORRECTION (continued)
U.S. Pat. No. 12,075,496 B2

In Columns 7 & 8, in TABLE 2, under "Attribute name", Line 4, delete "5gQosProfile" and insert -- 5gQoSProfile --, therefor.

In Columns 7 & 8, in TABLE 2, under "Data type", Line 4, delete "Qos" and insert -- QoS --, therefor.

In Columns 7 & 8, in TABLE 3, under "Attribute name", Line 4, delete "5gQosProfile" and insert -- 5gQoSProfile --, therefor.

In Columns 7 & 8, in TABLE 3, under "Data type", Line 4, delete "Qos" and insert -- QoS --, therefor.

In Column 9, Line 67, delete "etc." and insert -- etc; --, therefor.

In Column 11, Line 43, delete "that" and insert -- the --, therefor.